(12) United States Patent
Tzeng et al.

(10) Patent No.: US 8,693,858 B2
(45) Date of Patent: Apr. 8, 2014

(54) ELECTRIC WATER HEATER HAVING FILTERING DEVICE

(75) Inventors: Hsinn-Jyh Tzeng, Taipei (TW); Jhao-Kai Huang, Tainan (TW); Chun-Chen Tso, Tainan (TW); Jyun-Yi Wu, Kaohsiung (TW); Shin-Hsien Chao, Tainan (TW)

(73) Assignee: Southern Taiwan University of Science and Technology, Yongkang (TW)

( * ) Notice: Subject to any disclaimer, the term of this patent is extended or adjusted under 35 U.S.C. 154(b) by 0 days.

(21) Appl. No.: 13/545,233

(22) Filed: Jul. 10, 2012

(65) Prior Publication Data

US 2014/0016917 A1    Jan. 16, 2014

(51) Int. Cl.
*F24H 1/18* (2006.01)

(52) U.S. Cl.
USPC ............ 392/449; 392/441; 392/450; 392/451

(58) Field of Classification Search
None
See application file for complete search history.

(56) References Cited

U.S. PATENT DOCUMENTS

| | | | | |
|---|---|---|---|---|
| 4,150,665 A | * | 4/1979 | Wolfson | 126/390.1 |
| 4,233,694 A | * | 11/1980 | Janosko et al. | 4/541.3 |
| 4,349,434 A | * | 9/1982 | Jaworski | 210/94 |
| 4,924,069 A | * | 5/1990 | Giordani | 392/485 |
| 5,408,578 A | * | 4/1995 | Bolivar | 392/490 |
| 6,395,172 B1 | * | 5/2002 | Koike | 210/282 |
| 6,943,325 B2 | * | 9/2005 | Pittman et al. | 219/481 |
| 2002/0152549 A1 | * | 10/2002 | Kanaya et al. | 4/596 |
| 2007/0235381 A1 | * | 10/2007 | Tsai | 210/287 |
| 2008/0283391 A1 | * | 11/2008 | Ogawa et al. | 204/242 |
| 2010/0133163 A1 | * | 6/2010 | Tzeng et al. | 210/223 |
| 2010/0320135 A1 | * | 12/2010 | Sun | 210/244 |

* cited by examiner

*Primary Examiner* — Thor Campbell
(74) *Attorney, Agent, or Firm* — Jackson IPG PLLC

(57) ABSTRACT

An electric water heater having a filtering device includes an electric water heating device and a filtering device. The filtering device communicates with the electric water heating device, and includes a shell having at least an accommodating area, an inlet connecting to one end of the shell and communicating with the accommodating area, an outlet connecting to the other end of the shell and communicating with the electric water heating device and the accommodating area, a porous magnetic resin film located inside the accommodating area, and a calcium sulfite filter membrane in the accommodating area and between the outlet and the porous magnetic resin film. With the combination of the porous magnetic resin film and the calcium sulfite filter membrane respectively for the absorption of metallic impurities in water and chlorine removal, the scales can be avoided from generating after the electric water heating device heats the water.

4 Claims, 2 Drawing Sheets

ELECTRIC WATER HEATER HAVING FILTERING DEVICE

BACKGROUND OF THE INVENTION

1. Field of the Invention

The present invention relates to an electric water heater having a filtering device, and particularly to an electric water heater which is able to avoid any scales from generating, by means of the combination of the porous magnetic resin film and the calcium sulfite filter membrane respectively for the absorption of metallic impurities in water and chlorine removal.

2. Description of Related Art

In a conventional electric water heater, after the cool water is added, a heating means such as an igniting device and hot water coil is used to heat the water for the user to use.

The regional nature of the hard water gives the formation of scales after heating. The accumulation of the scales adversely affects, even damage the electric water heater. One approach has been proposed to solve the above problem by using gas as the heating fuel. The gas water heater needs to be installed in a well-ventilated location. Therefore, it cannot be applied in the bathroom of a general suite or a confined environment. The gas water heater produces carbon monoxide poisoning, which is often heard in our society. Furthermore, when the gas exhausts, some inconveniences occur. For example, the gas is cut off when the user is taking shower.

For the currently available water heaters, no filters are designed exclusively for the electric water heater. Most of the commercially available filters contains active carbon and are used to filter the drinking water. They cannot be replaced directly. Even though they are replaced, there often happen problems such as unqualified specification and high cost.

Therefore, there is a need of a novel electric water heater which overcomes the above shortcomings in the prior art.

SUMMARY OF THE INVENTION

This present invention aims at avoiding any scales from generating after the electric water heating device heats the water, by means of the combination of the porous magnetic resin film and the calcium sulfite filter membrane respectively for the absorption of metallic impurities in water and chlorine removal. Such a structure offers advantages of superior filtering effect, easy replacement, low production cost and prolonged service life for the electric water heater.

In order to achieve the above and other objectives, the electric water heater of the invention contains an electric water heating device and a filtering device, communicating with the electric water heating device. The filtering device includes a shell having at least an accommodating area, an inlet connecting to one end of the shell and communicating with the accommodating area, an outlet connecting to the other end of the shell and communicating with the electric water heating device and the accommodating area, a porous magnetic resin film located inside the accommodating area, and a calcium sulfite filter membrane in the accommodating area and between the outlet and the porous magnetic resin film.

In one embodiment of the invention, the electric water heating device includes a casing, a hot water coil located in the casing, and an igniting unit.

In one embodiment of the invention, the hot water coil has an input section and an output section and the input section is located between the outlet and the hot water coil.

In one embodiment of the invention, the porous magnetic resin film is made by melting the rubber into liquid, mixing the melt rubber with magnetic powders, molded by a pressure molding machine, and then forming a plurality of holes.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended tables.

Figure 1:
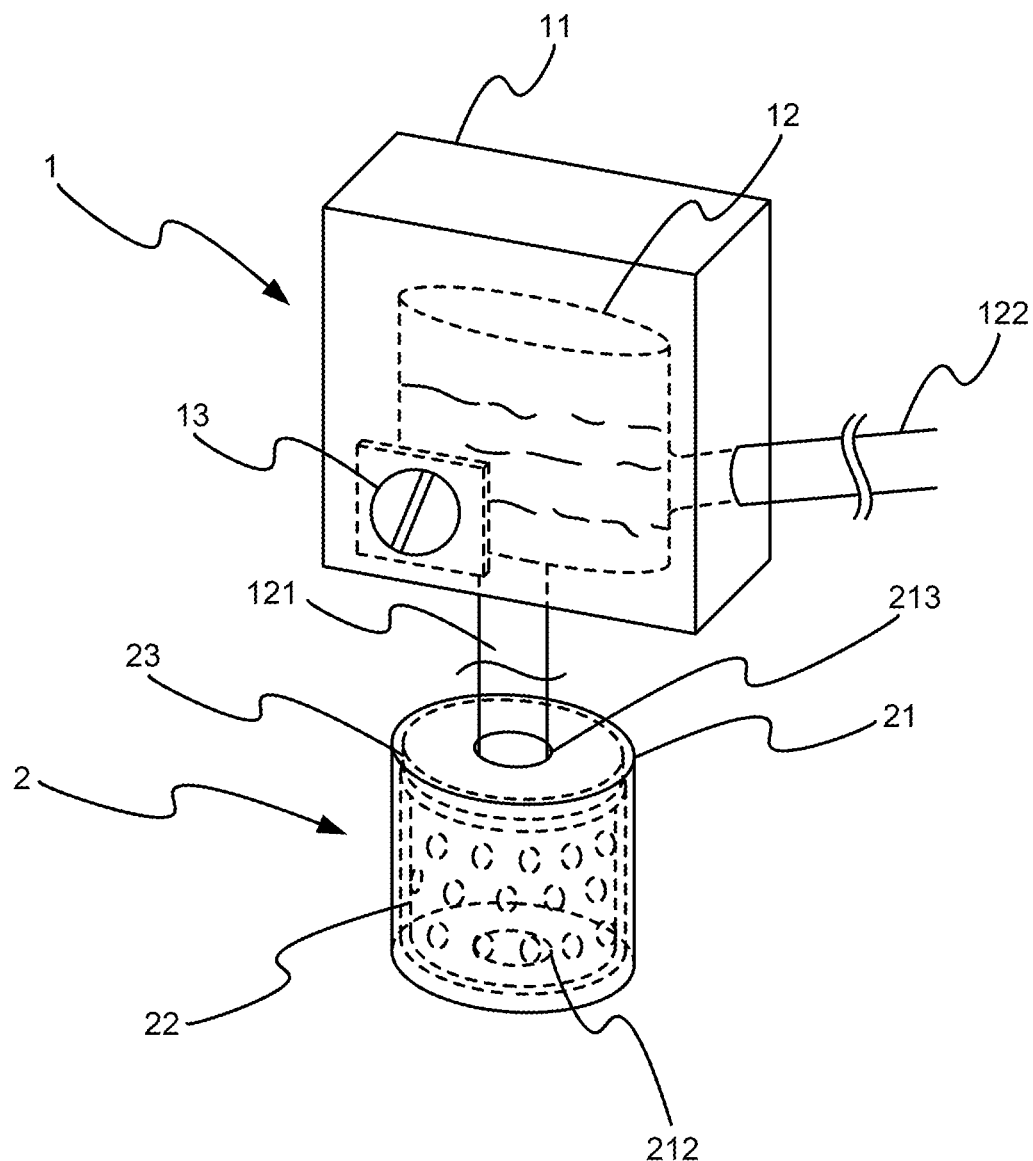
FIG. 1 is a schematic view of appearance of an electric water heater having a filtering device according to one embodiment of the invention.
Figure 2:
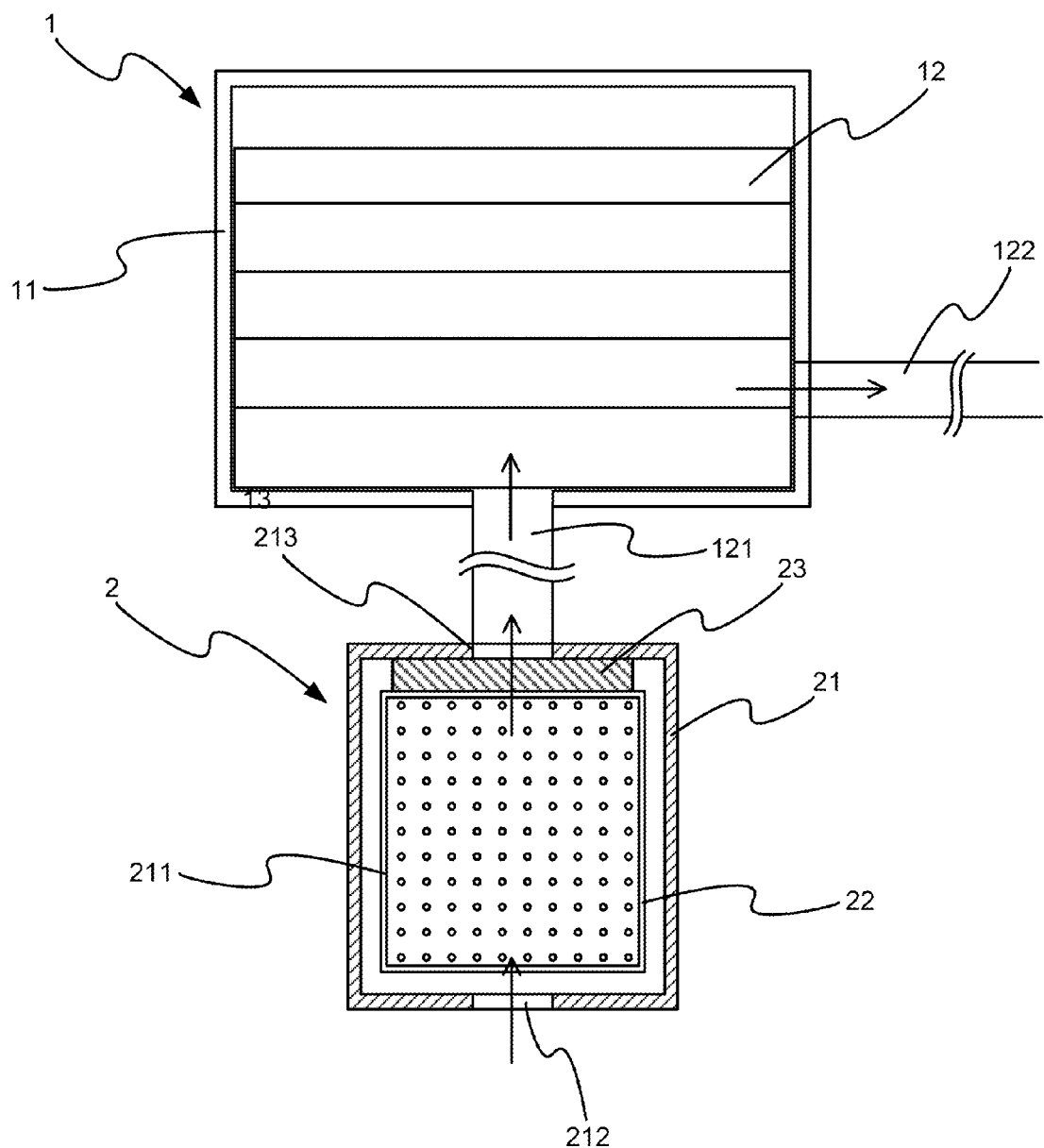
FIG. 2 is a schematic, cross-sectional view of an electric water heater having a filtering device according to one embodiment of the invention.

FIG. 1 is a schematic view of appearance of an electric water heater having a filtering device according to one embodiment of the invention. FIG. 2 is a schematic, cross-sectional view of an electric water heater having a filtering device according to one embodiment of the invention. As shown, the electric water heater of the invention at least includes an electric water heating device 1 and a filtering device 2.

The above electric water heating device 1 includes a casing 11, a hot water coil 12 located in the casing 11, and an igniting unit 13 connected to the hot water coil 12. The hot water coil 12 has an input section 121 and an output section 122.

The filtering device 2 communicates with the electric water heating device 1, and contains a shell 21 having at least an accommodating area 211, an inlet 212 connecting to one end of the shell 21 and communicating with the accommodating area 211, an outlet 213 connecting to the other end of the shell 21 and communicating with the electric water heating device 1 and the accommodating area 211, a porous magnetic resin film 22 located inside the accommodating area 211, and a calcium sulfite filter membrane 23 in the accommodating area 211 and between the outlet 213 and the porous magnetic resin film 22. The outlet 213 communicates with the input section 121 of the hot water coil 12. The porous magnetic resin film 22 is made by melting the rubber into liquid, mixing the melt rubber with magnetic powders, molded by a pressure molding machine, and then forming a plurality of holes. Thereby, a novel electric water heater having a filtering device can be realized.

When in use, connect the inlet 212 of the filtering device 2 to an external water supply (not shown) and connect the output section 122 of the electric water heating device 1 to a faucet (not shown). When the user opens the hot water, the water stream flows to the accommodating area 211 of the shell 21 through the inlet 212 of the electric water heater 2. The water flows through the porous magnetic resin film 22 and the calcium sulfite filter membrane 23 in turns and finally into the hot water coil 12 of the electric water heating device 1 through the input section 121. When the water flows through the porous magnetic resin film 22 and the calcium sulfite filter membrane 23, the combination of the porous magnetic resin film 22 and the calcium sulfite filter membrane 23 contributes to the absorption of metallic impurities in water and chlorine removal. After the filtration is completed, the water is directed to the hot water coil 12. The cooperation of the hot water coil 12 with the igniting unit 13 heats the water which then flows to the internal of the faucet through the output section 122. Thereby, it avoids any scales from being formed due the heating of the water.

When the filtering device 2 is to be replaced, the inlet 212 and the outlet 213 are respectively detached from the external water supply and the input section 121 of the hot water coil 12. A new filtration device 2 is taken for replacement in a manner that the inlet 212 and the outlet 213 are attached to the external water supply and the input section 121 of the hot water coil 12. Thereby, the replacement is completed.

In summary, the electric water heater having a filtering device according to this invention can effectively improve the shortcomings in the prior art. Taking advantage of combination of the porous magnetic resin film and the calcium sulfite filter membrane respectively for the adsorption of metallic impurities in water and chlorine removal, the scales can be avoided from generating after the electric water heating device heats the water. Such a structure offers advantages of superior filtering effect, easy replacement, low production cost and prolonged service life for the electric water heater.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. An electric water heater having a filtering device comprising:
   an electric water heating device comprising a casing and a hot water coil located in the casing; and
   a filtering device, in direct fluid communication with the electric water heating device, wherein the filtering device comprises:
      a shell separate from the casing and having at least an accommodating area, an inlet connecting to one end of the shell and in fluid communication with the accommodating area, an outlet connecting to the other end of the shell and in fluid communication with the electric water heating device and the accommodating area,
      a porous magnetic resin film located inside the accommodating area, and
      a calcium sulfite filter membrane in the accommodating area and between the outlet and the porous magnetic resin film.

2. The electric water heater of claim 1, wherein the electric water heating device further comprises an igniting unit connected with the hot water coil.

3. The electric water heater of claim 2, wherein the hot water coil has an input section and an output section, wherein the input section is located between the outlet and the hot water coil.

4. The electric water heater of claim 1, wherein the porous magnetic resin film is made by melting rubber into liquid, mixing the melted rubber with magnetic powders, molding by a pressure molding machine, and then forming a plurality of holes.

* * * * *